(12) United States Patent
Engelsma et al.

(10) Patent No.: US 11,373,438 B2
(45) Date of Patent: Jun. 28, 2022

(54) FIXED LENGTH FINGERPRINT REPRESENTATION

(71) Applicant: Board of Trustees of Michigan State University, East Lansing, MI (US)

(72) Inventors: Joshua J. Engelsma, Lansing, MI (US); Kai Cao, San Diego, CA (US); Anil K. Jain, East Lansing, MI (US)

(73) Assignee: Board of Trustees of Michigan State University, East Lansing, MI (US)

( * ) Notice: Subject to any disclaimer, the term of this patent is extended or adjusted under 35 U.S.C. 154(b) by 0 days.

(21) Appl. No.: 17/058,193

(22) PCT Filed: Feb. 10, 2020

(86) PCT No.: PCT/US2020/017489
§ 371 (c)(1),
(2) Date: Nov. 24, 2020

(87) PCT Pub. No.: WO2020/167655
PCT Pub. Date: Aug. 20, 2020

(65) Prior Publication Data
US 2021/0365532 A1  Nov. 25, 2021

Related U.S. Application Data

(60) Provisional application No. 62/803,784, filed on Feb. 11, 2019.

(51) Int. Cl.
*G06V 40/12* (2022.01)
*G06T 7/33* (2017.01)
(Continued)

(52) U.S. Cl.
CPC .......... *G06V 40/1353* (2022.01); *G06F 21/32* (2013.01); *G06K 9/6257* (2013.01);
(Continued)

(58) Field of Classification Search
CPC ...... G06F 21/32; G06K 9/6257; G06K 9/629; G06N 3/0454; G06N 3/08; G06T 7/33;
(Continued)

(56) References Cited

U.S. PATENT DOCUMENTS

2004/0042642 A1  3/2004  Bolle et al.
2014/0331059 A1  11/2014  Rane et al.
(Continued)

OTHER PUBLICATIONS

Kai Cao and Anil K. Jain, "Fingerprint Indexing and Matching: An Integrated Approach", Department of Computer Science and Engineering. Michigan State University, East Lansing, Michigan 48824.
Dehua Song, Jufu Feng, "Fingerprint Indexing Based on Pyramid Deep Convolutional Feature". Key Laboratory of Machine Perception (MOE), School of EECS, Peking University.
(Continued)

*Primary Examiner* — Premal R Patel
(74) *Attorney, Agent, or Firm* — Harness, Dickey & Pierce, P.L.C.

(57) ABSTRACT

A computer-implemented method for generating a representation for a fingerprint includes receiving, by a computer processor, an image of a given fingerprint. The method extracts particular attributes for the given fingerprint from the image using a first neural network. The first neural network is trained to identify particular attributes in fingerprints and constructs a first feature vector from the extracted particular attributes, where the first feature vector has a first fixed length. The method includes extracting textural features of the given fingerprint from the image using a second neural network, where the second neural network is trained to identify textural features that are not limited to particular attributes and constructing a second feature vector from the extracted textural features, where the second feature vector has a second fixed length. The method includes concatenat-
(Continued)

ing the first feature vector with the second feature vector to form a representation for the given fingerprint.

20 Claims, 5 Drawing Sheets

(51) Int. Cl.
   *G06F 21/32* (2013.01)
   *G06K 9/62* (2022.01)
   *G06N 3/04* (2006.01)
   *G06N 3/08* (2006.01)

(52) U.S. Cl.
   CPC ............. *G06N 3/0454* (2013.01); *G06N 3/08* (2013.01); *G06T 7/33* (2017.01); *G06V 40/1359* (2022.01); *G06V 40/1371* (2022.01); *G06T 2207/20084* (2013.01)

(58) Field of Classification Search
   CPC ...... G06T 2207/20084; G06V 40/1353; G06V 40/1359; G06V 40/1371; G06V 10/454; G06V 10/82
   See application file for complete search history.

(56) References Cited

U.S. PATENT DOCUMENTS

2017/0344846 A1* 11/2017 Yoshida ............... A61B 5/7203
2018/0165508 A1   6/2018 Othman et al.
2019/0205589 A1*  7/2019 Lo ...................... G06V 40/1376

OTHER PUBLICATIONS

Anil K. Jain, Salil Prabhakar, Lin Hong, and Sharath Pankanti, "FingerCode: A Filterbank for Fingerprint Representation and Matching". Department of Computer Science and Engineering, Michigan State University, East Lansing, MI 48824. IBM T.J. Watson Research Center, Yorktown Heights, NY 10598, 1999.

Kho et al. "Fixed-length Bit-string Representation of Fingerprint by Normalized Local Structures", In: Cornell University Library/ Computer Science/Computer Vision and Pattern Recognition, Nov. 28, 2018, [online] [retrieved on Apr. 18, 2020 (Apr. 18, 2020)) Retrieved from the Internet <URL: https:f/arxiv.orgfabs/1811.11489>.

* cited by examiner

104

FIXED LENGTH FINGERPRINT REPRESENTATION

CROSS-REFERENCE TO RELATED APPLICATIONS

This application is a 371 U. S. National Phase of International Application No. PCT/US2020/017489, filed Feb. 10, 2020 which claims the benefit of U.S. Provisional Application No. 62/803,784, filed on Feb. 11, 2019. The entire disclosures of the above application are incorporated herein by reference.

FIELD

The present disclosure relates to fingerprint recognition systems and, more specifically, generation of a fixed length fingerprint representation.

BACKGROUND

Fingerprint recognition systems have become ubiquitous and can be found in a plethora of different domains, such as forensics, healthcare, mobile device security, mobile payments, border crossing, and national identification. To date, virtually all of these systems continue to rely upon the location and orientation of minutiae within fingerprint images for recognition.

Although fingerprint recognition systems based on minutiae (that is, handcrafted features) have been sufficient fingerprint recognition systems, the accuracy, efficiency (matching speed and template size), and security (homomorphic encryption) of fingerprint recognition systems could be improved.

This section provides background information related to the present disclosure which is not necessarily prior art.

SUMMARY

A computer-implemented method for generating a representation for a fingerprint includes receiving, by a computer processor, an image of a given fingerprint. The method includes extracting, by the computer processor, minutiae for the given fingerprint from the image using a first neural network, where minutiae are anomalies in ridge flow of the given fingerprint and the first neural network is trained to identify minutiae in fingerprints. The method includes constructing, by the computer processor, a first feature vector from the extracted minutiae or guided by the extracted minutiae, where the first feature vector has a first fixed length. The method further includes extracting, by the computer processor, textural features of the given fingerprint from the image using a second neural network, where the second neural network is trained to identify textural features that are not limited to minutiae. The method also includes constructing, by the computer processor, a second feature vector from the extracted textural features (that is, is given the freedom to extract textural features), where the second feature vector has a second fixed length and concatenating, by the computer processor, the first feature vector with the second feature vector to form a representation for the given fingerprint.

In other implementations, the method includes spatially aligning the image of the given fingerprint prior to the step of extracting minutiae for the given fingerprint from the image using the first neural network. In other implementations, the method includes spatially aligning the image using a spatial transformer network. In other implementations, the first neural network and the second neural network are convolutional neural networks.

In other implementations, the method includes extracting, by the computer processor, pores for the given fingerprint from the image using a third neural network, where the third neural network is trained to identify pores in fingerprints. In other implementations, the method includes constructing, by the computer processor, a third feature vector from the extracted pores, where the third feature vector has a third fixed length and concatenating, by the computer processor, the first feature vector, the second feature vector, and the third feature vector to form a representation for the given fingerprint.

In other implementations, the first neural network generates a minutiae map of the given fingerprint from the image, where the minutiae map indicates a location of each minutiae of the given fingerprint. In other implementations, an indication on the minutiae map includes a location and an intensity, and the location indicates a minutiae location and the intensity indicates a minutiae orientation. In other implementations, the method includes training, by the computer processor, the first neural network to extract a first fixed number of features corresponding to the first fixed length and training, by the computer processor, the second neural network to extract a second fixed number of features corresponding to the second fixed length.

In other implementations, the first fixed length is equal to the second fixed length. In other implementations, the method includes receiving, by the computer processor, a known fingerprint representation for comparison to the representation of the given fingerprint and determining, by the computer processor, a similarly between the known fingerprint representation and the representation of the given fingerprint.

A computer-implemented method for generating a representation for a fingerprint includes receiving, by a computer processor, an image of a given fingerprint. The method includes spatially aligning the image of the given fingerprint using a spatial transformer network, where the spatial transformer network predicts a transformation to apply to the image of the given fingerprint, and where the transformation is limited based on at least one of a maximum rotation and a maximum translation of the image. The method further includes extracting, by the computer processor, minutiae for the given fingerprint from the image using a first neural network, where minutiae are anomalies in ridge flow of the given fingerprint and the first neural network is trained to identify minutiae in fingerprints. The method also includes constructing, by the computer processor, a first feature vector from the extracted minutiae, where the first feature vector has a fixed length.

In other implementations, the method includes extracting, by the computer processor, textural features of the given fingerprint from the image using a second neural network, where the second neural network is trained using a training data set. In other implementations, the method includes constructing, by the computer processor, a second feature vector from the extracted textural features, where the second feature vector has a second fixed length and concatenating, by the computer processor, the first feature vector with the second feature vector to form a representation for the given fingerprint.

In other implementations, the training data set is a plurality of fingerprints and the first neural network is trained using the training data set and configured to extract minutiae based on minutiae domain knowledge incorporated into the first neural network.

A computer-implemented method for generating a representation for a fingerprint includes receiving, by a computer processor, an image of a given fingerprint. The method includes extracting, by the computer processor, particular attributes of the given fingerprint from the image using a first neural network, where the particular attributes of the given fingerprint are of the same type and the first neural network is trained to identify the particular attributes in fingerprints. The method further includes constructing, by the computer processor, a first feature vector from the extracted attributes, where the first feature vector has a first fixed length. The method also includes extracting, by the computer processor, textural features of the given fingerprint from the image using a second neural network, where the second neural network is trained to identify textural features that are not limited to the particular attributes. The method includes constructing, by the computer processor, a second feature vector from the extracted textural features, where the second feature vector has a second fixed length and concatenating, by the computer processor, the first feature vector with the second feature vector to form a representation for the given fingerprint.

In other implementations, the particular attributes of the given fingerprint include at least one of: (i) a fingerprint ridge orientation, (ii) minutiae points, where minutiae points are anomalies in ridge flow of the given fingerprint, and (iii) fingerprint pores. In other implementations, the method includes spatially aligning the image of the given fingerprint prior to the step of extracting particular attributes for the given fingerprint from the image using the first neural network. In other implementations, the method includes spatially aligning the image using a spatial transformer network. In other implementations, the first neural network and the second neural network are convolutional neural networks.

In other implementations, the method includes training, by the computer processor, the first neural network to extract a first fixed number of features corresponding to the first fixed length and training, by the computer processor, the second neural network to extract a second fixed number of features corresponding to the second fixed length. In other implementations, the first fixed length is equal to the second fixed length.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
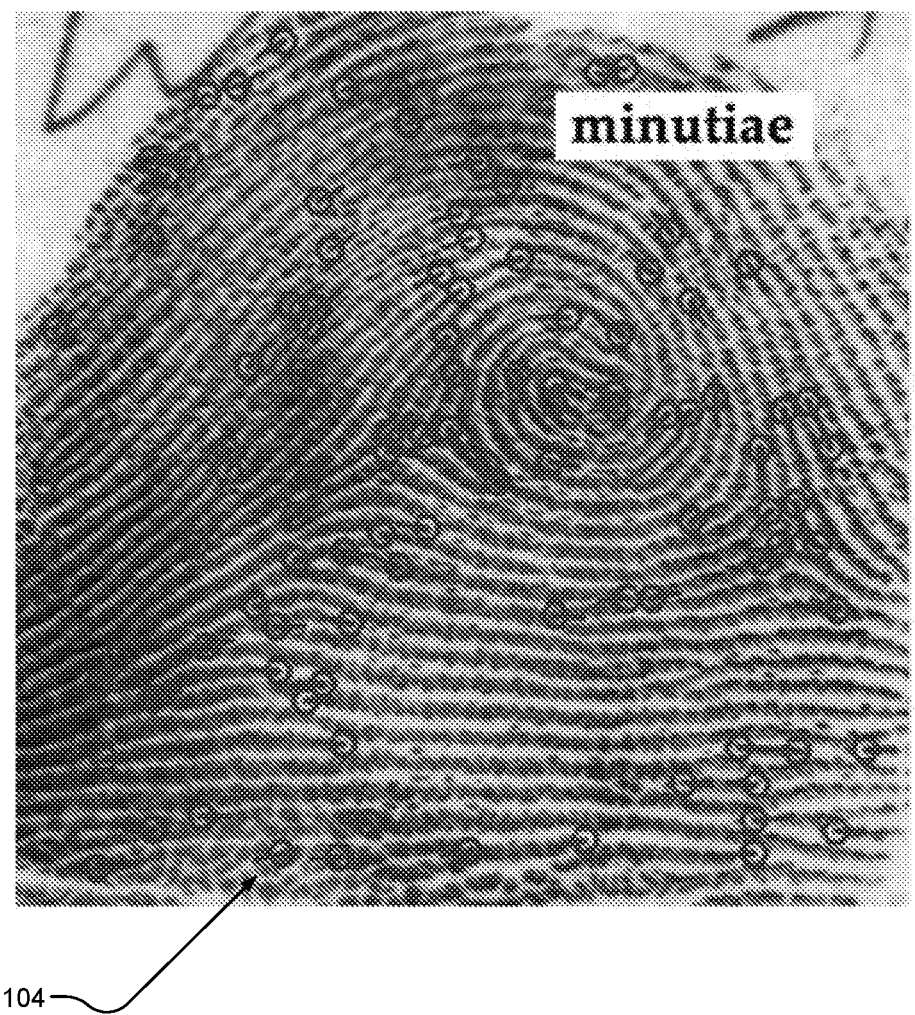
FIG. 1 is a graphical depiction of a plurality of minutiae on a scanned fingerprint.

Example embodiments will now be described more fully with reference to the accompanying drawings.

To increase efficiency, accuracy, and security of fingerprint recognition systems, a fixed length feature representation of fingerprints can be generated. Conventional minutiae-based representations are of variable length, since the number of extracted minutiae varies amongst different fingerprint images, even of the same finger. This causes two main problems: (i) pairwise fingerprint comparison is computationally demanding, accentuated when searching databases with an inordinate number of identities and (ii) template encryption, a necessity for user privacy protection, is a significant challenge. This necessitates devising extremely discriminative yet fixed-length, compact representations that go beyond just minutiae points.

Reliable minutiae extraction in low quality fingerprints (due to noise, distortion, finger condition) is problematic, causing false rejects in the recognition system. Given the limitations of minutiae-based matchers, a custom deep network may extract discriminative fixed length representations for state-of-the-art fingerprint recognition and search. The fixed length fingerprint representation incorporates fingerprint domain knowledge into the deep network architecture using a minutiae map. More specifically, the fixed length fingerprint architecture learns both a minutiae map based representation and a texture based representation. The concatenation of these two representations comprises the final fixed length fingerprint representation.

The final fixed length fingerprint representation incorporates two types of features: (i) standard fingerprint features, such as ridge-orientation, minutiae, and pores, and (ii) learned texture features. In this way, the first set of features represent known discriminative fingerprint characteristics and the second set of features represent newly identified discriminative fingerprint characteristics. These two or possibly more representations are concatenated to create a fixed length fingerprint representation that incorporates multiple levels of discriminative features.

In an example embodiment, the two sets of features are identified using trained neural networks. A first neural network, for example, a multi-task deep convolutional neural network architecture, is trained with domain knowledge to identify certain fingerprint features that are known to be discriminative. For example, minutiae, which are anomalous locations in the ridge flow of a fingerprint, are discriminative among fingerprints. The first neural network is trained using a training data set and the domain knowledge to identify minutiae in a fingerprint and simultaneously generate a fixed length representation guided by the location and orientation of each identified minutiae of the fingerprint.

A second neural network learns discriminating fingerprint features by being trained only with a large training data set of fingerprints, such as a database of 400,000 fingerprint impressions from 40,000 unique fingers. The second neural network is not trained using domain knowledge; therefore, the second neural network learns discriminating fingerprint features without being required to identify known characteristics using domain knowledge, referred to as textural features. In this way, the second neural network identifies features different from the minutiae features identified by the first neural network. The second neural network identifies these textural features to generate a fixed length representation of the fingerprint capable of discriminating one fingerprint from another.

Each fixed length representation of the fingerprint can be concatenated to create a final fixed length representation of the fingerprint. A database, for example, a gallery, of fingerprint representations can be created to compare to an input fingerprint, such as a query or probe fingerprint. Using fixed length fingerprint representations drastically reduces computational requirements and time needed to compare an input fingerprint against a database. Moreover, the fixed length fingerprint representation includes multiple layers of discriminative features to increase accuracy.

Additional benefits of a fixed length fingerprint representation include encryption capabilities. That is, having a variable number of features, for example, a varying number of minutiae, makes encryption of data more difficult. Generating a fixed representation allows for easier encryption of fingerprints, which can be sensitive, personal information.

In example embodiments, prior to generating a first fixed length representation and a second fixed length representation, an input fingerprint, for inclusion in the database or for comparison to the database, is aligned using a spatial transformer. The spatial transformer or shallow localization network combined with a grid sampler crops and aligns the input fingerprint prior to extracting the first and second representation. A high-level overview of the fixed length fingerprint representation generation system is provided in pseudocode describing the process shown in Algorithm 1, below.

---

Algorithm 1 Extract Fingerprint Representation

1: l(I): shallow localization network
2: g(I, x, y, θ): bilinear grid sampler
3: s(I): inception stem
4: m($F_{map}$): minutiae branch
5: t($F_{map}$): texture branch
6:
7: Input: Unaligned 448 × 448 fingerprint image $I_f$
8: (x, y, θ) ← l($I_f$)
9: $I_t$ ← g($I_f$, x, y, θ)
10: $F_{map}$ ← s($I_t$)
11: $R_{minutiae}$ ← m($F_{map}$)
12: $R_{texture}$ ← t($F_{map}$)
13: $R_{fused}$ ← $R_{minutiae}$ ⊕ $R_{texture}$
14: Output: fingerprint representation $R_{fused}$ ∈ $\mathbb{R}^{512}$

---

Referring now to FIG. 1, a graphical depiction of a plurality of minutiae on a scanned fingerprint is shown. FIG. 1 is an example input fingerprint or fingerprint that is maintained in a database with an associated fixed length representation and compared against the input fingerprint. A minutiae 104 is circled and includes a directional line indicating a corresponding orientation. Additional discriminative features of a fingerprint may be the fingerprint ridge orientation of the fingerprint as well as pores on the fingerprint. Each of these features may vary from fingerprint scan to fingerprint scan, even of the same fingerprint. For example, while the fingerprint of FIG. 1 has identified a set of minutiae, a different scan of the same fingerprint may identify greater or fewer minutiae on the same fingerprint, making it impossible to compare each minutiae to a corresponding minutiae.

Figure 2:
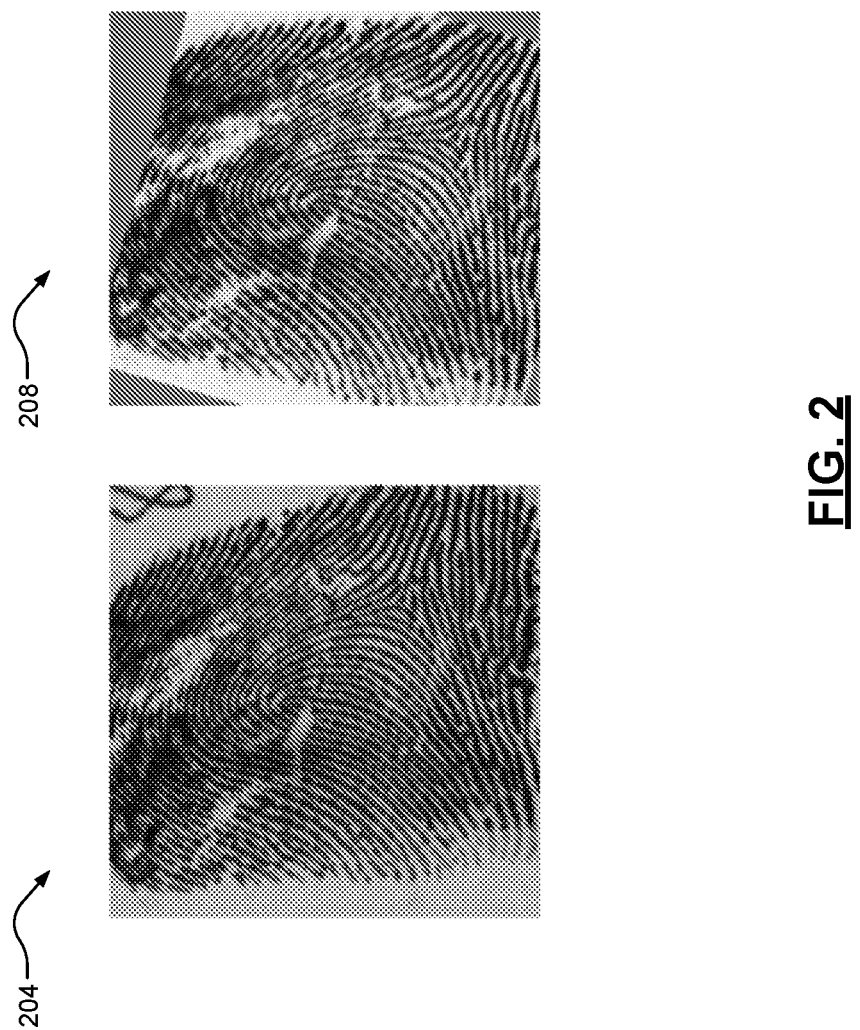
FIG. 2 is a graphical depiction of an aligned fingerprint for generating a fixed length fingerprint representation.

Referring now to FIG. 2, a graphical depiction of an aligned fingerprint for generating a fixed length fingerprint representation is shown. As mentioned previously and discussed in more detail below, before generating the first fixed length representation or feature vector and the second fixed length representation or feature vector, an input fingerprint 204 is cropped and aligned by a spatial transformer to create an aligned fingerprint 208 and to normalize the input as much as possible. In various implementations, the spatial transformer proposes a rotation, x and y translations, and scaling to be applied to the input fingerprint 204 using a localization network. The aligned fingerprint 208 proceeds to a base network, including the first and second neural networks, for feature extraction.

The input to generate the fixed length fingerprint representation may be a 448×448 grayscale fingerprint image, or larger for higher resolution images, which is passed through the spatial transformer or shallow localization network of lines 1, 2, 8 and 9 of Algorithm 1, above. In various implementations, the first neural network and the second neural network can be trained with images captures at 500 pixels per inch. Additionally, or alternatively, each network can be trained with higher resolution images, such as 1000 pixels per inch, to train one of or all of the networks to identify and extract features such as pores on a fingerprint.

As mentioned above, the spatial transformer is configured to crop and align the input fingerprint 204 and generate the aligned fingerprint 208. After applying the spatial transformation to the input fingerprint 204 ($I_f$), a cropped and aligned fingerprint, aligned fingerprint 208 ($I_t$), is passed to the first neural network and the second neural network, simultaneously. In other embodiments, the first neural network and the second neural network are combined into a single, multi-task neural network with shared parameters. Combining the neural networks would reduce the number of parameters or features of the fixed-length fingerprint representation and reduce a memory footprint of the system.

In an example embodiment, Table 1, below, depicts localization network architecture.

| Type | Output Size | Filter Size, Stride |
|---|---|---|
| Convolution | 128 × 128 × 24 | 5 × 5, 1 |
| Max Pooling | 64 × 64 × 24 | 2 × 2, 2 |
| Convolution | 64 × 64 × 32 | 3 × 3, 1 |
| Max Pooling | 32 × 32 × 32 | 2 × 2, 2 |
| Convolution | 32 × 32 × 48 | 3 × 3, 1 |
| Max Pooling | 16 × 16 × 48 | 2 × 2, 2 |
| Convolution | 16 × 16 × 64 | 3 × 3, 1 |
| Max Pooling | 8 × 8 × 64 | 2 × 2, 2 |
| Fully Connected | 64 | |
| Fully Connected | 3 | |

In nearly all minutiae-based fingerprint recognition systems, the first step is to crop a region of interest (ROI) and then perform global alignment based on some reference points (such as the core point). However, this alignment is computationally expensive. Instead, using the spatial transformer requires only one forward pass through the shallow localization network (shown in Table 1, above), followed by bilinear grid sampling. One forward pass reduces the computational complexity of alignment. Additionally, the parameters of the shallow localization network are tuned to minimize the classification loss of the first and second neural network when extracting features and generating fixed length representations. In other words, the networks can determine a preferred transformation to better classify the input fingerprints, ultimately leading to more discriminative fixed-length representations.

As shown in line 8 of the above Algorithm 1, given an uncropped, unaligned input fingerprint 204 image ($I_f$), the shallow localization network first hypothesizes the parameters of an affine transformation matrix $A_\Theta$. Given $A_\Theta$, a grid sampler $T_\Theta(G_i)$ samples the input fingerprint 204 image $(I_f)$ pixels $(x_i^f, y_i^f)$ for every target grid location $(x_i^t, y_i^t)$ to output the cropped, aligned fingerprint 208 image $(I_t)$ in accordance with Equation 1, below.

$$\begin{pmatrix} x_i^f \\ y_i^f \end{pmatrix} = T_\theta(G_i) = A_\theta \begin{pmatrix} x_i^t \\ y_i^t \\ 1 \end{pmatrix}$$

Once $I_t$ has been computed from the grid sampler $T_\Theta(G_i)$, as shown in line 9 of Algorithm 1, $I_t$ is passed on to the first neural network, shown in lines 10 and 11 of Algorithm 1, and the second neural network, shown in lines 10 and 12 of Algorithm 1, for classification. Finally, the parameters for the localization network are updated based upon the classification loss of the two networks. In order to get the spatial transformer to properly converge, (i) the learning rate for the localization network parameters was scaled by 0:035, (ii) the upper bound of the estimated affine matrix translation and rotation parameters was set to 224 pixels and ±60 degrees, respectively, and (iii) the affine matrix scaling parameter was fixed to select a window of size 285×285 from the input fingerprint 204 image. These constraints are based on domain knowledge of the maximum extent a user would rotate/translate their fingers during placement on a reader platen and the typical "high quality" area of a fingerprint image (usually the center portion). Further information on the spatial transformer can be found in M. Jaderberg, K. Simonyan, A. Zisserman, et al., "Spatial transformer networks," in Advances in neural information processing systems, pp. 2017-2025 (2015), which is incorporated in its entirety by reference.

In other embodiments, the spatial transformer can be any number of visual attention mechanisms where the goal of the visual attention mechanism is to localize and/or transform a region of interest, such as a fingerprint, within a neural network and perform "fine-grained" classification. The visual attention mechanism may be directly embedded within the neural network, rather than requiring a "pre-alignment" step prior to inputting to the network. These visual attention mechanisms do not necessarily require landmark supervision but could be supplemented with landmark supervision in other embodiments. Further information on visual attention mechanisms can be found in J. Ba, V. Mnih, and K. Kavukcuoglu, Multiple object recognition with visual attention, (2014), which is incorporated in its entirety by reference.

Figure 3:
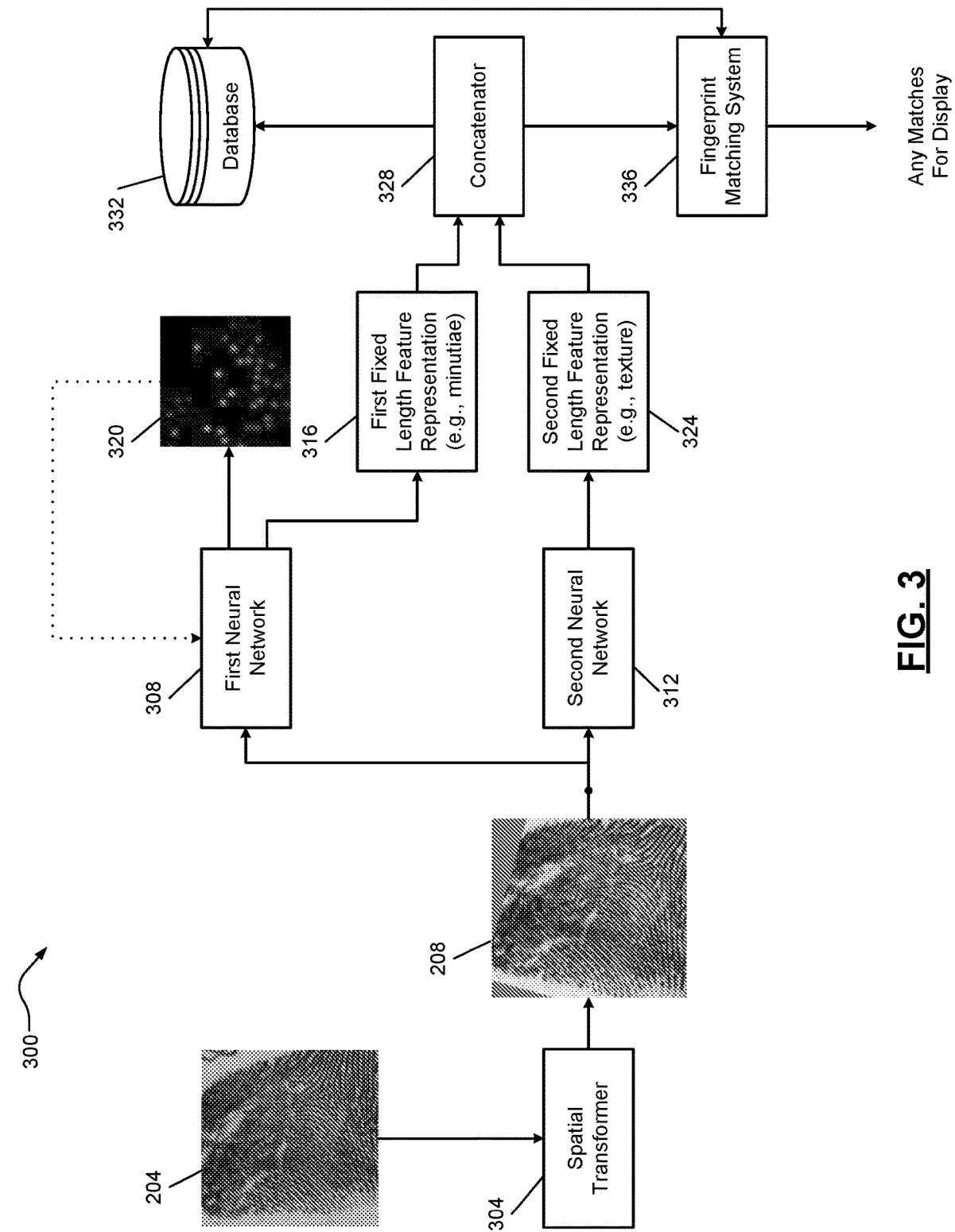
FIG. 3 is an example functional block diagram depicting the generation of a fixed length fingerprint representation.

Referring now to FIG. 3, an example functional block diagram depicting the generation of a fixed length fingerprint representation generation system 300 is shown. The input fingerprint 204 is input into the fixed length fingerprint representation generation system 300. A spatial transformer 304 receives the input fingerprint 204 and outputs the aligned fingerprint 208. As described above, the spatial transformer 304 includes the shallow localization network that proposes alignment factors to apply to the input fingerprint 204, resulting in the aligned fingerprint 208 being output. The aligned fingerprint 208 is then sent to a first neural network 308 and a second neural network 312. In various implementations, the aligned fingerprint 208 is sent to each of the networks simultaneously.

The first neural network 308 may be a minutiae-based feature extraction network trained using a training data set and domain knowledge. That is, the first neural network 308 is trained with domain knowledge that includes known feature identification, such as minutiae. In various implementations, the first neural network 308 is trained with any domain knowledge directed toward identifying particular attributes or discriminative features of a fingerprint including, but not limited to, ridge-orientation and pores. The first neural network 308 generates a first fixed length feature representation 316 guided by the minutiae features identified in the aligned fingerprint 208. The first neural network 308 also generates a minutiae map 320, also referred to as a feature map, that indicates extracted minutiae location and orientation. The generated minutiae map 320 may be used as feedback to the first neural network 308 to continue to train the first neural network 308 to identify these minutiae features and guide the extraction of fixed-length minutiae-based representations.

The second neural network 312 is trained with a training data set of fingerprints, for example, 400,000 fingerprint impressions from 40,000 unique fingers. In this way, the second neural network 312 has the freedom to identify discriminating fingerprint features, for example, texture features, of the training data set of fingerprints on which the second neural network 312 is trained. The second neural network 312 generates a second fixed length feature representation 324. The second fixed length feature representation 324 indicates which texture features have been identified from the aligned fingerprint 208.

The second neural network 312 performs the primary learning task of predicting a finger class label directly from the aligned fingerprint 208 and essentially learns the texture cues in the aligned fingerprint 208. The first neural network 308 predicts the finger class label but also has a related side task of predicting the minutiae locations and orientations in the aligned fingerprint 208. In this manner, the first neural network 308 uses domain knowledge to guide feature extraction and generate representations that indicate fingerprint minutiae locations and orientations. The textural cues identified by the second neural network 312 act as complementary discriminative information to the minutiae-guided representation of the first neural network 308.

To prevent overfitting the first neural network 308 to the training data set, the domain knowledge is incorporated into the first neural network 308 to guide it to learn a more discriminative representation. In various implementations, the specific domain knowledge incorporated into the first neural network 308 is the minutiae map 320. Note that the minutiae map 320 may not be explicitly used in the final fixed length fingerprint representation, but the information contained in the minutiae map 320 may be indirectly embedded in the first neural network 308 during training.

In one example embodiment, the fixed length fingerprint representation generation system 300 may include a third neural network trained with the training set data and configured to extract particular attributes, such as pore features using pore domain knowledge. Similar to the first neural network 308, the third neural network is trained to extract discriminative fingerprint features based on the particular attributes or the pore domain knowledge. The third neural network would also generate a third fixed length representation representing extracted pore data of the input fingerprint 204, which would be included in the final fixed length fingerprint representation by a concatenator 328, as described below. Additionally, or alternatively, the third neural network can identify other discriminative fingerprint attributes, such as ridge-orientation.

A minutiae map is essentially a c-channel heat map quantizing the locations (x, y) and orientations $\theta \in [0, 2\pi]$ of the minutiae within a fingerprint image, for example, the aligned fingerprint 208. More formally, let h and w be the height and width of the input fingerprint 204 image $I_f$ and $T=\{m_1, m_2, \ldots, m_n\}$ be its minutiae template with n minutiae points, where $m_t=(x_t, y_t, \theta_t)$ and $t=1, \ldots, n$. Then, the minutiae map 320 $H \in R^{h \times w \times c}$ at (i, j, k) can be computed by summing the location and orientation contributions of each of the minutiae in T, shown in Equation 2, below:

$$H(i, j, k) = \sum_{t=1}^{n} C_s((x_t, y_t), (i, j)) \cdot C_o(\theta_t, 2k\pi/c)$$

where $C_S$ and $C_O$ calculate the spatial and orientation contribution of minutiae $m_t$ to the minutiae map at (i, j, k) based upon the Euclidean distance of $(x_t, y_t)$ to (i, j) and the orientation difference between $\theta_t$ and $2k\pi/c$, as follows in Equations 3 and 4:

$$C_s((x_t, y_t), (i, j)) = \exp\left(-\frac{\|(x_t, y_t) - (i, j)\|_2^2}{2\sigma_s^2}\right)$$

$$C_o(\theta_t, 2k\pi/c) = \exp\left(-\frac{d\phi(\theta_t, 2k\pi/c)}{2\sigma_s^2}\right)$$

where $d\Phi=(\theta_1, \theta_2)$, shown below in Equation 5, is the orientation difference between angles $\Theta_1$ and $\theta_2$:

$$d\phi(\theta_1, \theta_2) = \begin{cases} |\theta_1 - \theta_2| & -\pi \leq -\theta_1 - \theta_2 \leq \pi \\ 2\pi - |\theta_1 - \theta_2| & \text{otherwise.} \end{cases}$$

Figure 4:
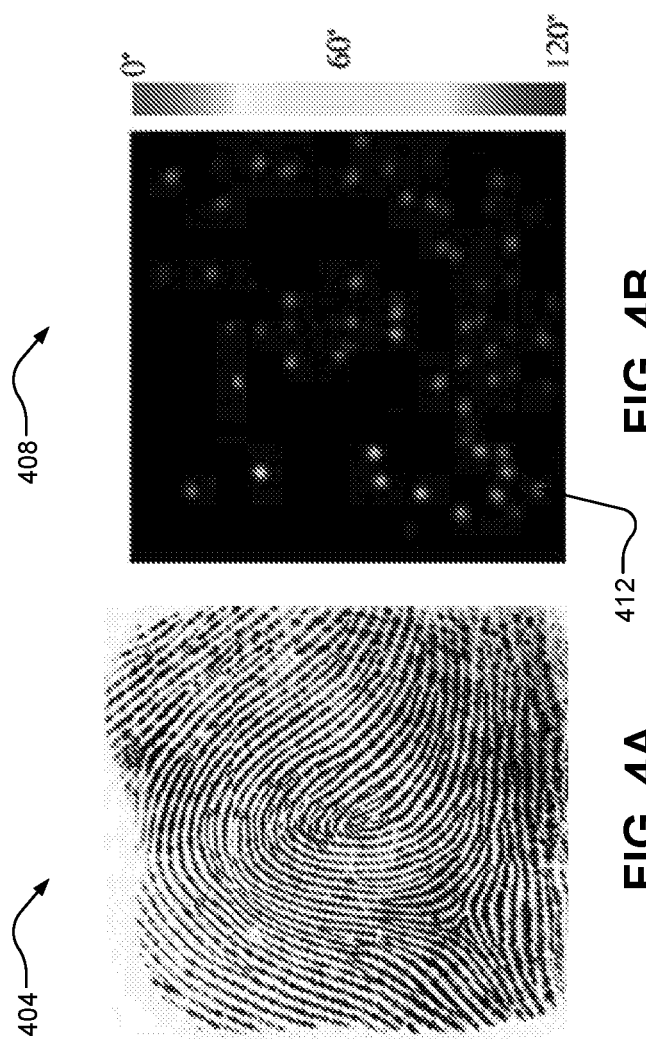
FIGS. 4A and 4B are an example scanned fingerprint and corresponding minutiae map of the scanned fingerprint indicating a location and orientation of each minutiae of the scanned fingerprint.

In various implementations, minutiae maps of size 128×128×6 are extracted to encode the minutiae locations and orientations of the input fingerprint 204 image. An example fingerprint image and its corresponding minutiae map are shown in FIGS. 4A and 4B.

As shown in line 13 of Algorithm 1, the concatenator 328 receives the first fixed length feature representation 316 and the second fixed length feature representation 324 and combines the two fixed length representations into a fixed length fingerprint representation of the aligned fingerprint 208, which is output in line 14 of Algorithm 1. While the first neural network 308 also generates the minutiae map 320, as previously mentioned, the minutiae map 320 is used to guide training of the first neural network 308.

The first fixed length feature representation 316 and the second fixed length feature representation 324 are each vectors of a fixed length of 256 features. Alternative fixed lengths may be used, and the fixed length of the first fixed length feature representation 316 may be different from the fixed length of the second fixed length feature representation 324. In the present embodiment, the concatenator 328 receives two feature representations, each including 256 features. The concatenator 328 combines the two feature representations to create the fixed length fingerprint representation that includes a total of 512 features. As described above, in another implementation including additional neural networks, the additional neural networks may generate the same length of features or may generate a feature vector of a different length, which is combined into the fixed length fingerprint representation.

In various implementations, the final fixed length fingerprint representation may be stored in a database 332 or transmitted to a fingerprint matching system 336. The fingerprint matching system 336 compares the fixed length fingerprint representation to all of the fixed length fingerprint representations stored in the database 332. Then, the fingerprint matching system 336 may output a fingerprint that matches the fixed length fingerprint representation or data associated with the matched fingerprint, such as, for example, identifying data of the matched fingerprint.

Referring to FIGS. 4A and 4B, an example scanned fingerprint 404 and corresponding minutiae map 408 of the scanned fingerprint 404 indicating a location and orientation of each minutiae of the scanned fingerprint 404 is shown. That is, a mapped minutiae point 412 indicates a location of the minutiae based on a location on the minutiae map 408. Additionally, an orientation of the mapped minutiae point 412 is indicated by an intensity of the mapped minutiae point 412.

Figure 5:
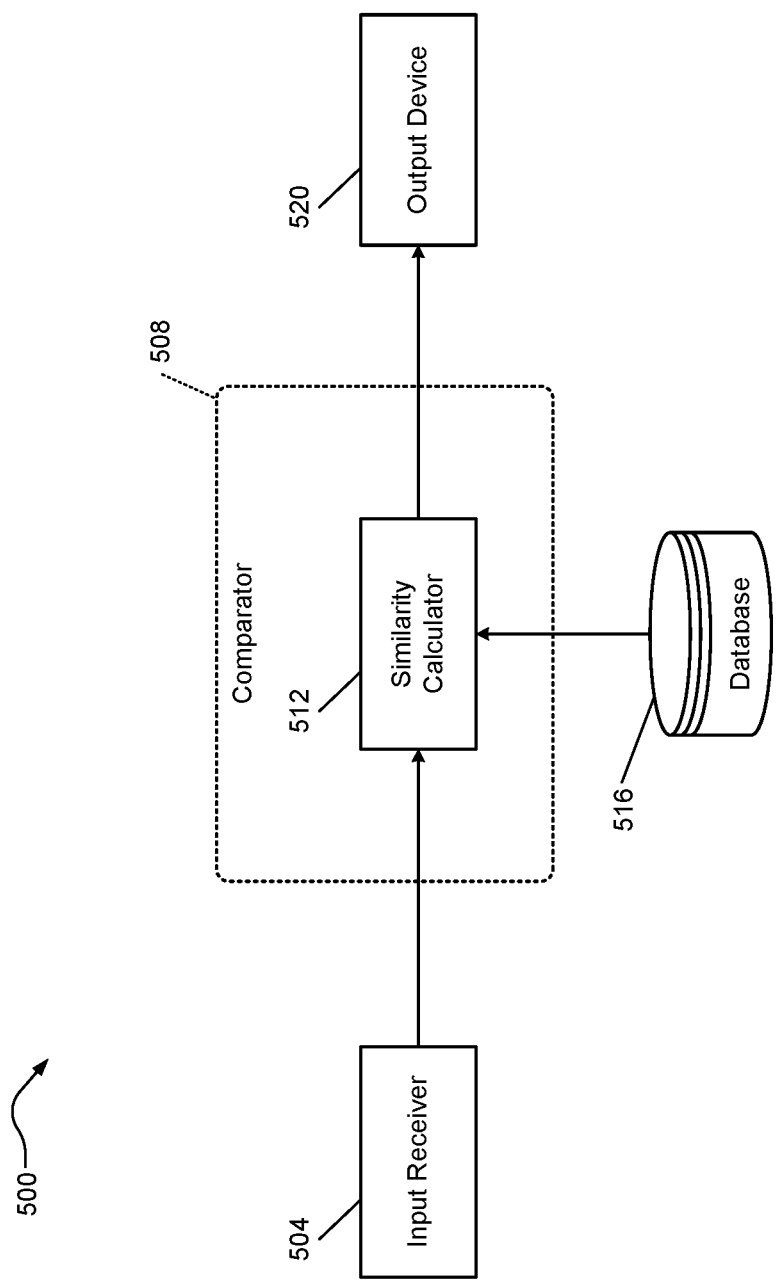
FIG. 5 is an example functional block diagram of a fingerprint matching apparatus.

Referring now to FIG. 5, an example functional block diagram of a fingerprint matching apparatus 500 is shown. The fingerprint matching apparatus 500 stores fingerprint representations generated by the fixed length fingerprint representation generation system 300 described with respect to FIG. 3. An input receiver 504 receives a query fingerprint. In various implementations, the received query fingerprint is a fixed length fingerprint representation of a corresponding individual. That is, prior to the fingerprint matching apparatus 500 receiving the query fingerprint via the input receiver 504, a fixed length fingerprint representation of a scanned fingerprint of the individual was generated.

Additionally, or alternatively, the input receiver 504 may scan the fingerprint of an individual as a query fingerprint. If input receiver 504 is configured to receive or scan a fingerprint, the input receiver may also be configured to generate a fixed length fingerprint representation of the scanned fingerprint, as described in FIG. 3. A comparator 508 receives the query fingerprint representation and uses a similarity calculator 512 to identify a fingerprint match. For example, the similarity calculator 512 compares the query fingerprint representation to a plurality of fingerprint representations stored in a database 516.

To calculate a similarity, the similarity calculator 512 calculate a match score between the query fingerprint representation and each of the plurality of fingerprint representations in the database 516. In various implementations, the match score is computed as a cosine similarity (other distance metrics such as Euclidean distance could also be used) between the query fingerprint representation and each of the plurality of fingerprint representations stored in the database 516. The similarity calculator 512 identifies the highest match score as corresponding to a match fingerprint of the plurality of fingerprint representations. That is, whichever fingerprint representation included of the plurality of fingerprint representations is most similar to the query fingerprint representation is the fingerprint representation that results in the highest match score.

In another example embodiment, the minutiae map 408 can be used to directly compute a minutiae map match score with a database that stores minutiae maps. The minutiae map match score can be averaged and fused with the match score calculated above. In this manner, an input fingerprint could first be compared to a number of other fingerprints in a database very quickly by first finding the most similar fingerprints, for example, the ten most similar fingerprint, using the fixed-length representation and then, from the ten most similar fingerprints, identifying a best candidate by using both the match score when comparing the fixed-length representations and the minutiae map match score determined when comparing the minutiae maps. Such as method would improve the identification accuracy without significantly hurting the search speed.

In an example embodiment, the similarity calculator 512 may store a match threshold value. When determining a similarity between the query fingerprint representation and each of the plurality of fingerprint representations, the similarity must exceed the match threshold value to be considered a match.

An output device 520 receives the match fingerprint representation and may output a corresponding match fingerprint to a display device, such as a mobile computing device. In various implementations, the similarity calculator 512 may transmit identification information stored in the database 516 corresponding to the match fingerprint representation to the output device 520 for the output device 520 to display identification information of the match fingerprint representation. The database 516 stores, with each fingerprint representation, a corresponding scanned fingerprint as well as identification information associated with the corresponding scanned fingerprint, including, but not limited to, a name, a photo, access credentials, a security clearance, etc.

In one example embodiment, the output device 520 can grant access to a device such as, for example, a mobile computing device. The input receiver 504 can be attached to the mobile computing device. When a user is attempting to unlock the mobile computing device, the user scans their fingerprint via the input receiver 504, which generates a corresponding fixed length fingerprint representation. The similarity calculator 512 compares the generated input fixed length fingerprint representation to an approved fixed length fingerprint representation stored in the database 516. If the generated input fixed length fingerprint representation matches the approved fixed length fingerprint representation, the output device 520 grants the user access to the mobile computing device. In this example, all features of FIG. 5 may be included on the device.

One of the primary advantages of the fixed-length fingerprint representation is that it can be compared to other representations (either in a 1:1 or 1:N matching scenario) using only addition and multiplication operations. Prevailing minutiae matchers require additional operations, such as sorting or comparisons. Since the fixed length fingerprint representation can be matched using only additions and multiplications, it is feasible to encrypt the fixed length fingerprint representation and subsequently match in the encrypted domain. Whereas prevailing minutiae representations would require encryption, followed by decryption prior to matching, the fixed length fingerprint representation can always remain encrypted. Being able to perform multiplications and additions in the encrypted domain is known as fully-homomorphic encryption.

Additional embodiments of the fingerprint matching apparatus 500 are contemplated which usefully homomorphic encryption. In one embodiment, a fixed-length fingerprint representation is extracted from an input fingerprint in the manner described above and then encrypted using fully homomorphic encryption. The encrypted fingerprint representation is then compared in the encrypted domain to a plurality of encrypted enrollment templates (i.e., encrypted fixed length fingerprint representation) residing in the database 516. It is noted that the comparison is done without decrypting the input or any other encrypted enrollment templates. The encryption scheme can be any scheme which enables performing multiplications and additions on the encrypted data.

In another example embodiment, the fixed-length fingerprint representation is first extracted from an input fingerprint in the manner described above. Next, the fixed-length representation is converted into a bit string, for example by hashing via a known hashing algorithm. The bit string is then encrypted using fully homomorphic encryption. Lastly, the encrypted bit string is compared to a plurality of encrypted enrollment templates residing in the database 516. The process of converting the fixed length fingerprint representation into a bit string prior to encryption further speeds up the comparison time in the encrypted domain The techniques described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

Some portions of the above description present the techniques described herein in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the described techniques include process steps and instructions described herein in the form of an algorithm. It should be noted that the described process steps and instructions could be embodied in software, firmware or hardware, and when embodied in software, could be downloaded to reside on and be operated from different platforms used by real time network operating systems.

The present disclosure also relates to an apparatus for performing the operations herein. This apparatus may be specially constructed for the required purposes, or it may comprise a computer selectively activated or reconfigured by a computer program stored on a computer readable medium that can be accessed by the computer. Such a computer program may be stored in a tangible computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various systems may also be used with programs in accordance with the teachings herein, or it may prove convenient to construct more specialized apparatuses to perform the required method steps. The required structure for a variety of these systems will be apparent to those of skill in the art, along with equivalent variations. In addition, the present disclosure is not described with reference to any particular programming language. It is appreciated that a variety of programming languages may be used to implement the teachings of the present disclosure as described herein.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

What is claimed is:

1. A computer-implemented method for generating a representation for a fingerprint, comprising:
   receiving, by a computer processor, an image of a given fingerprint;
   extracting, by the computer processor, minutiae for the given fingerprint from the image using a first neural network, where minutiae are anomalies in ridge flow of the given fingerprint and the first neural network is trained to identify minutiae in fingerprints;
   constructing, by the computer processor, a first feature vector from the extracted minutiae, where the first feature vector has a first fixed length;
   extracting, by the computer processor, textural features of the given fingerprint from the image using a second neural network, where the second neural network is trained to identify textural features that are not limited to minutiae;
   constructing, by the computer processor, a second feature vector from the extracted textural features, where the second feature vector has a second fixed length; and
   concatenating, by the computer processor, the first feature vector with the second feature vector to form a representation for the given fingerprint.

2. The method of claim 1 further comprises spatially aligning the image of the given fingerprint prior to the step of extracting minutiae for the given fingerprint from the image using the first neural network.

3. The method of claim 2 further comprises spatially aligning the image using a spatial transformer network.

4. The method of claim 1 wherein at least one of the first neural network and the second neural network are convolutional neural networks.

5. The method of claim 1 further comprising:
   extracting, by the computer processor, pores for the given fingerprint from the image using a third neural network, where the third neural network is trained to identify pores in fingerprints;
   constructing, by the computer processor, a third feature vector from the extracted pores, where the third feature vector has a third fixed length; and
   concatenating, by the computer processor, the first feature vector, the second feature vector, and the third feature vector to form a representation for the given fingerprint.

6. The method of claim 1 wherein the first neural network generates a minutiae map of the given fingerprint from the image, where the minutiae map indicates a location of each minutiae of the given fingerprint.

7. The method of claim 6 wherein each identified minutiae on the minutiae map includes a location and an intensity, and the location indicates a minutiae location and the intensity indicates a minutiae orientation.

8. The method of claim 1 further comprising:
   training, by the computer processor, the first neural network to extract a first fixed number of features corresponding to the first fixed length; and
   training, by the computer processor, the second neural network to extract a second fixed number of features corresponding to the second fixed length.

9. The method of claim 1 further comprising:
   receiving, by the computer processor, a known fingerprint representation for comparison to the representation of the given fingerprint; and
   determining, by the computer processor, a similarly between the known fingerprint representation and the representation of the given fingerprint.

10. The method of claim 9 further comprising, in response to the similarity between the known fingerprint representation and the representation of the given fingerprint exceeding a match threshold, granting access to a device receiving the image of the given fingerprint.

11. A computer-implemented method for generating a representation for a fingerprint, comprising:
    receiving, by a computer processor, an image of a given fingerprint;
    spatially aligning the image of the given fingerprint using a spatial transformer network, where the spatial transformer network predicts a transformation to apply to the image of the given fingerprint, where the transformation is limited based on at least one of a maximum rotation and a maximum translation of the image;
    extracting, by the computer processor, minutiae for the given fingerprint from the image using a first neural network, where minutiae are anomalies in ridge flow of the given fingerprint and the first neural network is trained to identify minutiae in fingerprints; and
    constructing, by the computer processor, a first feature vector from the extracted minutiae, where the first feature vector has a fixed length.

12. The method of claim 11 further comprising:
    extracting, by the computer processor, textural features of the given fingerprint from the image using a second neural network, where the second neural network is trained using a training data set;

constructing, by the computer processor, a second feature vector from the extracted textural features, where the second feature vector has a second fixed length; and concatenating, by the computer processor, the first feature vector with the second feature vector to form a representation for the given fingerprint.

13. The method of claim 12 wherein the training data set is a plurality of fingerprints and the first neural network is trained using the training data set and configured to extract minutiae based on minutiae domain knowledge incorporated into the first neural network.

14. A computer-implemented method for generating a representation for a fingerprint, comprising:

receiving, by a computer processor, an image of a given fingerprint;

extracting, by the computer processor, particular attributes of the given fingerprint from the image using a first neural network, where the particular attributes of the given fingerprint are of the same type and the first neural network is trained to identify the particular attributes in fingerprints;

constructing, by the computer processor, a first feature vector from the extracted attributes, where the first feature vector has a first fixed length;

extracting, by the computer processor, textural features of the given fingerprint from the image using a second neural network, where the second neural network is trained to identify textural features that are not limited to the particular attributes;

constructing, by the computer processor, a second feature vector from the extracted textural features, where the second feature vector has a second fixed length; and concatenating, by the computer processor, the first feature vector with the second feature vector to form a representation for the given fingerprint.

15. The method of claim 14 wherein the particular attributes of the given fingerprint include at least one of: (i) a fingerprint ridge-orientation, (ii) minutiae points, where minutiae points are anomalies in ridge flow of the given fingerprint, and (iii) fingerprint pores.

16. The method of claim 14 further comprises spatially aligning the image of the given fingerprint prior to the step of extracting particular attributes for the given fingerprint from the image using the first neural network.

17. The method of claim 16 further comprises spatially aligning the image using a spatial transformer network.

18. The method of claim 14 wherein at least one of the first neural network and the second neural network are convolutional neural networks.

19. The method of claim 14 further comprising:

training, by the computer processor, the first neural network to extract a first fixed number of features corresponding to the first fixed length; and training, by the computer processor, the second neural network to extract a second fixed number of features corresponding to the second fixed length.

20. The method of claim 14 further comprising:

receiving, by the computer processor, a known fingerprint representation for comparison to the representation of the given fingerprint;

determining, by the computer processor, a similarly between the known fingerprint representation and the representation of the given fingerprint; and in response to the similarity between the known fingerprint representation and the representation of the given fingerprint exceeding a match threshold, granting access to a device receiving the image of the given fingerprint.

* * * * *